US012774687B2

(12) United States Patent
John et al.

(10) Patent No.: US 12,774,687 B2
(45) Date of Patent: Oct. 27, 2026

(54) FUEL TYPE DETECTION FOR INTERNAL COMBUSTION ENGINE

(71) Applicant: Caterpillar Inc., Peoria, IL (US)

(72) Inventors: Bobby John, Peoria, IL (US); Jonathan W. Anders, Peoria, IL (US); Michael Bardell, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 73 days.

(21) Appl. No.: 19/043,988

(22) Filed: Feb. 3, 2025

(65) Prior Publication Data

US 2026/0226868 A1 Aug. 6, 2026

(51) Int. Cl.
*F02D 19/08* (2006.01)
*F02D 41/00* (2006.01)

(52) U.S. Cl.
CPC ....... *F02D 19/081* (2013.01); *F02D 41/0025* (2013.01)

(58) Field of Classification Search
CPC .... F02D 19/081; F02D 41/0025; F02D 41/14; F02D 41/403; F02M 25/00
See application file for complete search history.

(56) References Cited

U.S. PATENT DOCUMENTS 7,779,808 B2 8/2010 Kurotani et al.
8,412,439 B2 * 4/2013 Warner ................. F02D 41/266 123/304
8,473,180 B2 * 6/2013 Wang .................. F02D 41/0025 123/299
9,856,812 B2 * 1/2018 Garagnani ............ F02D 35/027
11,639,698 B1 5/2023 Schroeder et al.
2002/0134362 A1 * 9/2002 Deutsch .............. F02D 19/0615 123/575
2015/0354472 A1 * 12/2015 Zhong ................. F02D 41/0025 123/445

FOREIGN PATENT DOCUMENTS

| | | | |
|---|---|---|---|
| JP | 5001933 | B2 | 8/2012 |
| KR | 101341477 | B1 | 12/2013 |
| WO | 2009043316 | A1 | 4/2009 |
| WO | 2013173333 | A1 | 11/2013 |
| WO | 2023052615 | A1 | 4/2023 |

* cited by examiner

*Primary Examiner* — Grant Moubry

(57) ABSTRACT

A system for controlling an internal combustion engine includes an internal combustion engine configured to combust a plurality of fuels including a first fuel having a first energy density and a second fuel having a second energy density, a fuel injector configured to inject the first fuel and to inject the second fuel, and a sensor configured to generate signals that indicate combustion of fuel within the internal combustion engine. They system further includes an electronic control module configured to: receive the signals from the sensor, generate commands to cause the fuel injector to inject fuel, determine whether the injected fuel corresponds to the first fuel or to the second fuel based on the signals from the sensor, and generate adjusted commands to cause the fuel injector to inject fuel based on whether the fuel was determined to correspond to the first fuel or to the second fuel.

20 Claims, 4 Drawing Sheets

FUEL TYPE DETECTION FOR INTERNAL COMBUSTION ENGINE

TECHNICAL FIELD

The present disclosure relates generally to internal combustion engine systems, and more particularly, to methods and systems for controlling an internal combustion engine according to a type of fuel supplied to the engine.

BACKGROUND

Internal combustion engines are useful in many applications to generate power for propulsion, to perform work, or to provide electrical energy. Internal combustion engines include sophisticated control systems to optimize fuel economy, improve transient response, and reduce undesired emissions.

While many engines are configured for use with diesel fuel, some internal combustion engine designs are intended for use with other types of fuel, such as fuels that tend to produce relatively low levels of greenhouse gases when combusted. While these alternatives to diesel fuel, sometimes referred to as "alternative" fuels, have some advantages, they also have different combustion characteristics (e.g., energy density). Due to the different combustion characteristics some engines are intended for use with a single type of fuel. In other systems, the hardware and software for the engine is modified to enable combustion of a different fuel, a redesign process that can be costly and time consuming.

KR 101341477 B1, issued on Dec. 13, 2013 ("the '477 patent") describes a device for controlling an engine depending on a variation in the fuel provided to the engine. The device in the '477 patent uses a sensor for measuring temperature of exhaust gas or for measuring speed of an engine. These engine output sensors are used to determine fuel characteristics. The system in the '477 patent does not, however, determine fuel type using internal or input aspects of the engine.

The methods and systems of the present disclosure may solve one or more of the problems set forth above or other problems in the art. The scope of the protection provided by the present disclosure, however, is defined by the attached claims, and not by the ability to solve any specific problem.

SUMMARY

In one aspect, a system for controlling an internal combustion engine may include an internal combustion engine configured to combust a plurality of fuels including a first fuel having a first energy density and a second fuel having a second energy density, a fuel injector configured to inject the first fuel and to inject the second fuel, and a sensor configured to generate signals that indicate combustion of fuel within the internal combustion engine. They system may further include an electronic control module configured to: receive the signals from the sensor, generate commands to cause the fuel injector to inject fuel, determine whether the injected fuel corresponds to the first fuel or to the second fuel based on the signals from the sensor, and generate adjusted commands to cause the fuel injector to inject fuel based on whether the fuel was determined to correspond to the first fuel or to the second fuel.

In another aspect, a method for controlling an internal combustion engine that is capable of use with a primary fuel and a pilot fuel may include generating commands that cause a fuel injector to inject the primary fuel for combustion in the internal combustion engine, receiving signals from a sensor, the signals indicating pressure according to combustion of the primary fuel within the internal combustion engine, determining whether the primary fuel corresponds to a first fuel or to a second fuel based on the signals from the sensor, and generating adjusted fuel injector commands based on whether the primary fuel was determined to correspond to the first fuel or to the second fuel.

In yet another aspect, a system for controlling an internal combustion engine may include an internal combustion engine configured for use with different fuel types, a fuel injector configured to inject fuel, an in-cylinder pressure sensor connected to the internal combustion engine, and an electronic control module. The electronic control module may be configured to: receive signals from the in-cylinder pressure sensor, generate commands to cause current to be supplied to the fuel injector for a duration, the current causing the fuel injector to inject the fuel, and determine the duration based on the signals from the in-cylinder pressure sensor.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of +10% in the stated value.

Figure 1:
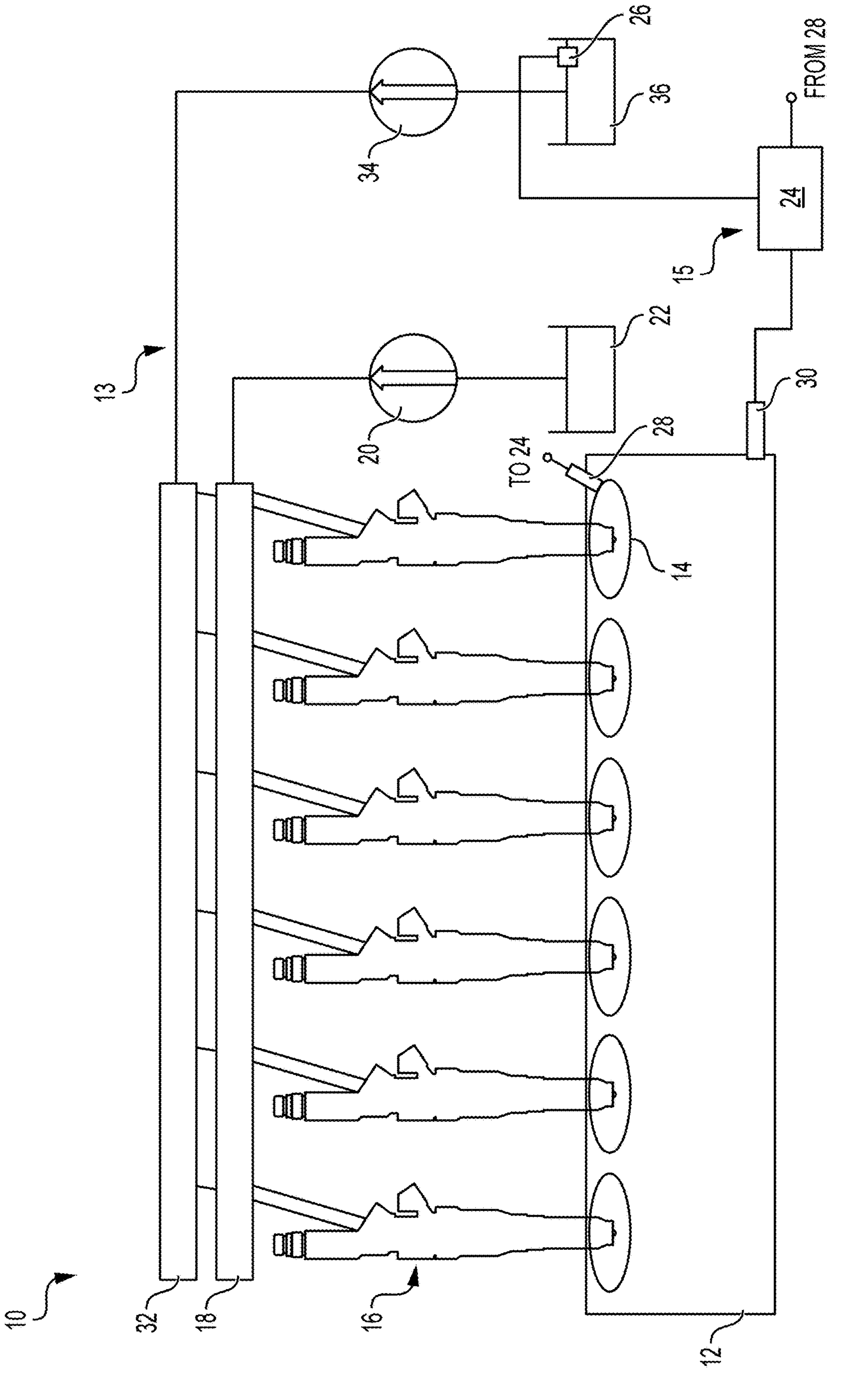
FIG. 1 is a schematic diagram of a system for controlling an internal combustion engine configured for combustion of different fuels, according to aspects of the disclosure.

FIG. 1 is a schematic diagram of a system 10 for controlling an internal combustion engine configured for use with different fuel types. As used herein, fuels with different "types" are fuels that have one or more different qualities that are associated with combustion of the fuel. These changing qualities include, as examples, energy density, heating values, cetane number, ignition point, etc. These fuels may be liquid fuels, such as diesel fuel, methanol, ethanol (including ethanol blends such as E85), naphtha, biodiesel, or others.

As shown in FIG. 1, system 10 may include an internal combustion engine 12, a fuel system 13 for supplying fuel to internal combustion engine 12, a sensor system 15, and an electronic control module (ECM) 24 in communication with the sensor system 15. Internal combustion engine 12 may include a plurality of cylinders 14 (e.g., six, ten, twelve, sixteen, twenty, etc.), six cylinders 14 being shown in FIG. 1. One or multiple fuel injectors 16 may be provided for injecting fuel that is combusted in each cylinder 14 of engine 12.

Internal combustion engine 12 may be configured for use with multiple fuels at the same time. In particular, internal combustion engine 12 is configured to combust a first fuel (e.g., diesel fuel, biodiesel fuel, or hydrotreated vegetable oil fuel) and a second fuel (e.g., methanol, ethanol, ethanol blends, or naphtha). In some examples, the first fuel is a pilot fuel that is used in a smaller quantity as compared to the second fuel, which is a primary fuel. These different fuels may be injected with the same set of injectors 16 or with different sets of injectors. In the illustrated embodiment, each individual fuel injector 16 is configured to inject two different fuels.

The first fuel may be stored in a fuel storage device 22 (e.g., a first fuel tank) and supplied to fuel injectors 16 via a fuel pump 20 and a common rail 18. The second fuel may be stored in a fuel storage device 36 (e.g., a second fuel tank) and supplied to injectors 16 via a fuel pump 34 and a common rail 32. If desired, system 10 may be configured for use with a single fuel at a particular time (e.g., only one fuel storage device and common rail are provided). Whether system 10 is configured for combustion of two fuels or a single fuel, the type of fuel supplied to system 10 may change over time.

Sensor system 15 may include sensors for monitoring speed of combustion (e.g., heat release rate, pressure, etc.), engine speed, fuel fill events, and other conditions of system 10. In particular, the sensor system may include a fill sensor 26, an in-cylinder pressure sensor 28, and an engine speed sensor 30. Fill sensor 26 may be configured to detect a quantity of fuel within fuel storage device 36. Fill sensor 26 may be, for example, a level sensor that measures the level of fuel. While fill sensor 26 is shown in connection fuel storage device 36 for the primary fuel (e.g., methanol, ethanol, or naphtha), a fill sensor 26 may also be provided to measure fill events associated with the pilot fuel contained in fuel storage device 22.

In-cylinder pressure sensor 28 may be configured to measure pressure within one of cylinders 14. While a single pressure sensor 28 is shown in FIG. 1, as understood, a pressure sensor 28 may be provided in each cylinder 14 of internal combustion engine 12. Engine speed sensor 30 may be configured to detect a position of a crankshaft of internal combustion engine 12, with changes in this position indicating speed of internal combustion engine 12. The sensor system may include other sensors, such as intake manifold temperature or pressure sensors, exhaust manifold temperature or pressure sensors, fuel temperature sensors, and others.

ECM 24 may be an electronic control module that controls one or more aspects of system 10, and may be configured to generate commands for controlling injectors 16 based on the type of fuel supplied to system 10. ECM 24 may be implemented as a single control unit that controls multiple aspects of system 10 and, in particular, control of injectors 16. In other examples, ECM 24 is implemented as multiple physical control units, the phrase "electronic control module" encompassing both single and multiple electronic control modules. ECM 24 may be enabled, via programming, to generate commands that control fuel injection events, including commands that are generated based on determining the fuel that was supplied to system 10. In particular, ECM 24 may be configured to generate commands that set a period of time during which current is supplied to injectors 16 based on the fuel that was supplied to system 10.

ECM 24 may embody a single microprocessor or multiple microprocessors that receive inputs and generate outputs. ECM 24 may include a memory, a secondary storage device, a processor such as a central processing unit, or any other means for accomplishing a task consistent with the present disclosure. The memory or secondary storage device associated with ECM 24 may store data and software to allow ECM 24 to perform its functions, including the functions described with respect to fuel injection method 300 (FIG. 3), described below. Numerous commercially available microprocessors can be configured to perform the functions of ECM 24. Various other known circuits may be associated with ECM 24, including signal-conditioning circuitry, communication circuitry, drive circuitry, power-source command circuitry, and other appropriate circuitry. ECM 24 may include circuitry for causing injectors 16 to inject fuel at a timing (e.g., crank angle position) that is adjusted when different fuels are supplied, as described below.

Figure 2:
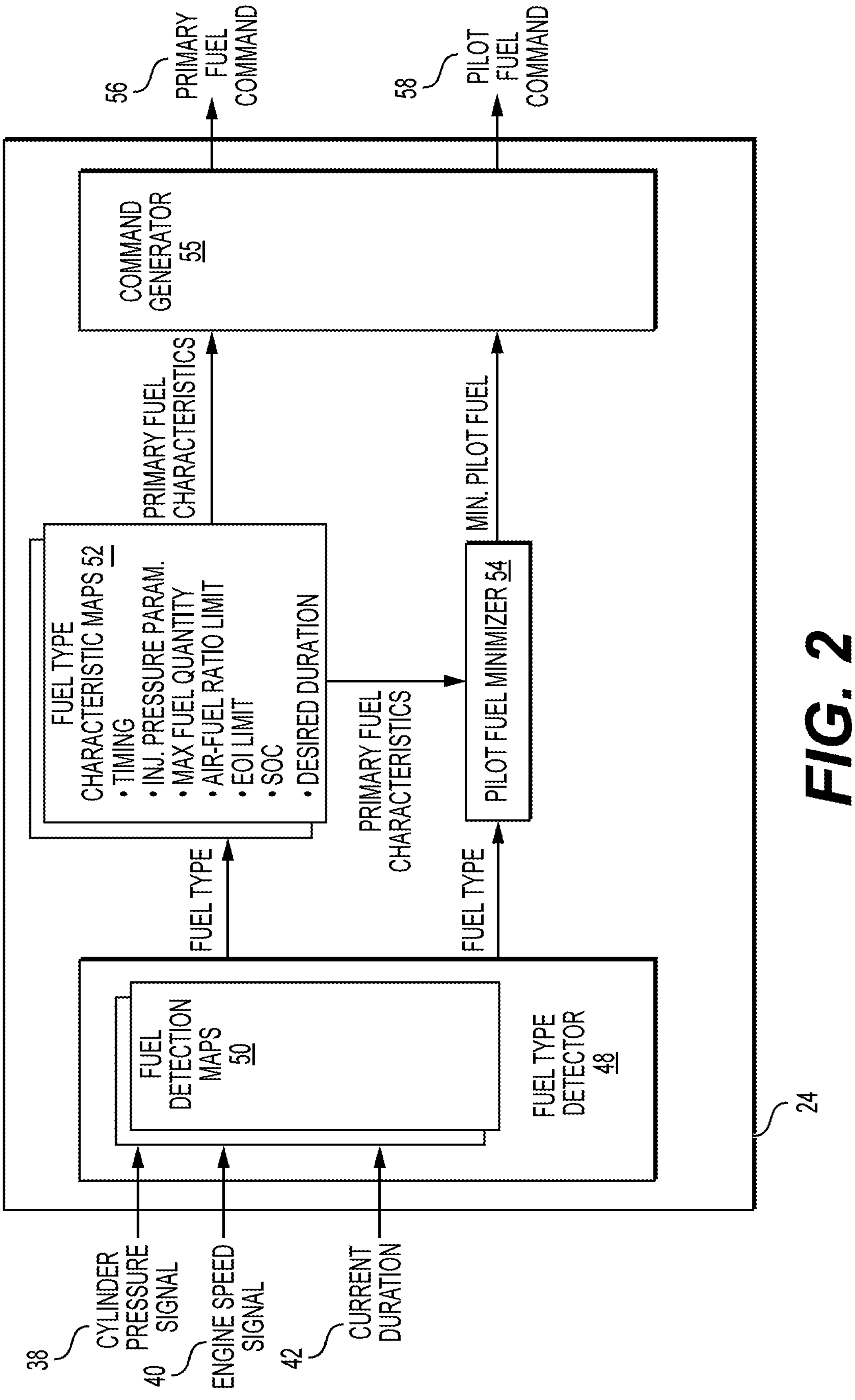
FIG. 2 is a block diagram of the electronic control module for the system of FIG. 1.

FIG. 2 is a block diagram showing an exemplary configuration of ECM 24 for determining a type of fuel that is supplied to system 10. As shown in FIG. 2, ECM 24 may receive signals from sensor system 15 as inputs. ECM 24 may also generate calculated values or commands that are used as inputs for one or more modules of ECM 24. In the illustrated example, ECM 24 receives a cylinder pressure signal 38 from in-cylinder pressure sensor 28, an engine speed signal 40 from engine speed sensor 30, and a signal that represents the desired amount of fuel, such as current duration signal 42 (e.g., a value calculated with ECM 24) or a commanded fuel quantity signal.

ECM 24 may generate outputs for controlling injectors 16 (communication lines between ECM 24 and injectors 16 not shown in FIG. 1). For example, ECM 24 may determine commands that control the injection of primary fuel, primary fuel commands 56, and commands that control the injection of pilot fuel, pilot fuel commands 58. In the illustrated embodiment, ECM 24 includes a fuel type detector 48 storing fuel detection maps 50, fuel type characteristic maps 52, a pilot fuel minimizer 54, and a command generator 55. These components (e.g., circuitry, data, programming, etc.) may allow ECM 24 to generate outputs for controlling injectors 16 based on fuel type.

Fuel type detector 48 may include fuel detection maps 50 that allow detector 48 to determine the type of fuel provided to fuel system 13. Fuel detection maps 50 may, for example, correlate combustion data, such as combustion pressure data and injector current data, with particular fuel types. The combustion data may additionally or alternatively include, for example, indicated mean effective pressure (IMEP), integrated apparent heat release rate (IAHRR), estimated load, or other values that can be calculated based on, for example, cylinder pressure and engine speed from cylinder pressure signal 38 and engine speed signal 40. The injector current duration data (from current duration input 42) may correspond to an amount of time that an injector was provided with current, this amount of time being associated with the quantity of fuel that was injected, allowing a correlation between the amount and/or rate of energy production and the quantity of injected fuel. Fuel detection maps 50 may be configured to output a fuel type based on the combustion data (e.g., IMEP), in association with current duration.

Fuel type detector 48 may receive inputs, such as cylinder pressure signal 38, engine speed signal 40, and current duration 42. Cylinder pressure signal 38 and engine speed signal 40 may be sensed values generated with sensors 28 and 30, respectively. Current duration 42 may be an estimated or calculated value (e.g., a current duration resulting from commands 56). If desired, fuel type detector 48 may receive any other inputs from sensor system 15.

Fuel type detector 48 may be configured to determine IMEP, IAHRR, or another value (e.g., load), based on cylinder pressure signal 38 and engine speed signal 40, and associate this value with the value of current duration 42. Based on these values, fuel detection maps 50 may identify corresponding values (e.g., stored IMEP and current duration values that match the actual IMEP and current duration values) to determine the corresponding fuel type. The fuel type may then be output to fuel type characteristic maps 52 and pilot fuel minimizer 54. The fuel type may correspond to the primary fuel supplied to system 10.

Fuel type characteristic maps 52 may include maps, lookup tables, or other data associated with each fuel type received from fuel type detector 48. Each fuel type may be associated with a set of characteristics that are used to determine commands for injection of fuel during operation of engine 12 based on the fuel type determined with fuel detection maps 50.

As shown in FIG. 2, fuel type characteristic maps 52 may store, for each fuel type: timing data, injection pressure parameter (commands for achieving a desired fuel pressure) data, maximum permissible fuel quantity data (the maximum quantity of fuel that can be injected in a particular fuel injection event), air-fuel ratio limit data (e.g., a maximum and minimum air-fuel ratio for each fuel type), end of injection (EOI) limit data (e.g., the latest timing at which a fuel type can be injected), and start of current (SOC) data (e.g., earliest and latest timings at which current may begin being supplied to injector 16 for the current fuel type, determined according to the timing at which the fuel is expected to release a portion of its energy). The primary fuel characteristics may also include desired amount of fuel data, or a desired fuel duration data. The desired fuel amount or desired duration data may correspond to the quantity of fuel that satisfies a corresponding request for power from internal combustion engine 12 (e.g., an amount of power requested by an operator, an electrical load, a hydraulic system, etc.). The primary fuel characteristics from maps 52 may be output to pilot fuel minimizer 54 and to command generator 55 for use in generating commands 56 and 58, as described below.

Pilot fuel minimizer 54 may receive the fuel type of the primary fuel from detector 48 and the characteristics for this fuel type from fuel type characteristic maps 52. Pilot fuel minimizer 54 may also receive the desired amount, or desired injection duration, of primary fuel from maps 52.

Pilot fuel minimizer 54 may be configured to determine the smallest amount of pilot fuel (e.g., the smallest quantity of pilot fuel that is injected to initiate combustion of the primary fuel) that would be injected based on the primary fuel characteristics (e.g., EOI limits, SOI data, and the desired fuel duration data) that are output from fuel type characteristic maps 52. Based on these inputs, pilot fuel minimizer 54 may determine the minimum quantity of pilot fuel that will result in effective combustion of the primary fuel, when the primary fuel is the type of fuel indicated with maps 50 and is injected according to the primary fuel characteristics determined with maps 52. The minimum quantity of pilot fuel may be output from pilot fuel minimizer 54 and received with command generator 55.

Fuel command generator 55 may determine the quantity of primary fuel (e.g., methanol, ethanol, naphtha, etc.) and the quantity of pilot fuel (e.g., diesel fuel) that will be injected, based on the primary fuel characteristics from fuel type characteristic maps 52 and the minimum quantity of pilot fuel from pilot fuel minimizer 54. In some aspects, command generator 55 may generate commands 56 that maximize the amount of primary fuel that is injected, and commands 58 that minimize the amount of pilot fuel that is injected (e.g., the amount of pilot fuel output from pilot fuel minimizer 54). The amount of primary fuel that is injected via commands 56 may be determined with command generator 55 based on start of current (SOC) limit data (e.g., SOC limit maps that set the earliest and latest timings at which current can be supplied for the determined fuel type), combustion timing (e.g., a time at which a predetermined amount of fuel has combusted, as determined based on cylinder pressure signal 38), and the minimum pilot fuel.

In some configurations, command generator 55 may determine the amount of primary fuel that satisfies a request for power from internal combustion engine 12 without violating constraints included in primary fuel characteristics from maps 52. For example, command generator 55 may determine the amount of primary fuel that, when injected with the minimum amount of pilot fuel from minimizer 54, results in production of a requested amount of power. Command generator 55 may also determine whether this amount of primary fuel would result in the injection of primary fuel at a time that is later than the EOI limit. When the EOI limit would be exceeded, command generator 55 may adjust the amount of pilot fuel and primary fuel that will be injected, increasing the amount of pilot fuel and reducing the amount of primary fuel to ensure that the injection of primary fuel concludes prior to the EOI limit. Further, in circumstances where the quantity of pilot fuel is increased significantly (e.g., by an amount that impacts combustion), command generator 55 may adjust the timing of pilot fuel and primary fuel injection to account for the combustion characteristics of the increased quantity of pilot fuel.

In some configurations, command generator 55 may be configured to gradually adjust fuel injection commands such that the duration of primary fuel injection lengthens and the end of injection gradually approaches the EOI limit. Command generator 55 may also generate commands 56 that target a desired combustion phasing, the phasing representing the time at which a predetermined amount of fuel (e.g., an amount of fuel that corresponds to 5%, 10%, 25%, or 50% of total energy) has combusted. Commands 56 and 58 may maximize the amount of primary fuel that is used as substitute for pilot fuel while avoiding significant combustion delay.

System 10, as described above, relates to dual-fuel engines that are configured to combust two different fuels, a primary fuel and a pilot fuel, system 10 being configured to determine fuel type of the primary fuel (e.g., with the pilot fuel being known). In other configurations, system 10 may be configured for use with only a single fuel type. In such configurations, pilot fuel minimizer 54 (FIG. 2) and pilot fuel command 58 may be omitted, as well as the components of fuel system 13 relating to injection of pilot fuel.

INDUSTRIAL APPLICABILITY

The disclosed aspects of the present disclosure may be applied to a variety of engines, and machines or vehicles having engines, that generate power for propulsion, move an implement, generate electrical energy, or perform other tasks. For example, the system may cause changes to the settings or calibration for internal combustion engine 12, adapting the commands for control of injectors 16 according to the type of fuel supplied to system 10.

Figure 3:
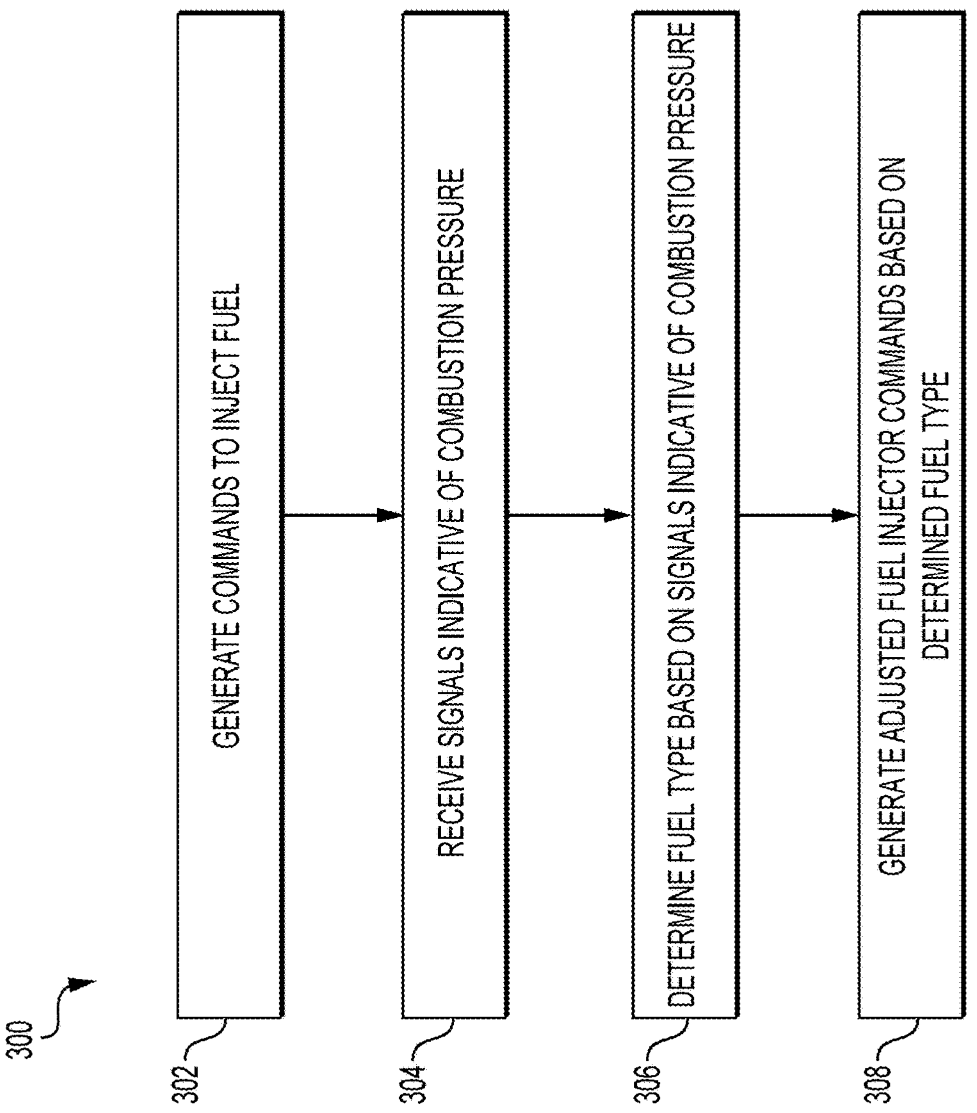
FIG. 3 is a flowchart of a method for controlling an internal combustion engine according to a determined fuel.
Figure 4:
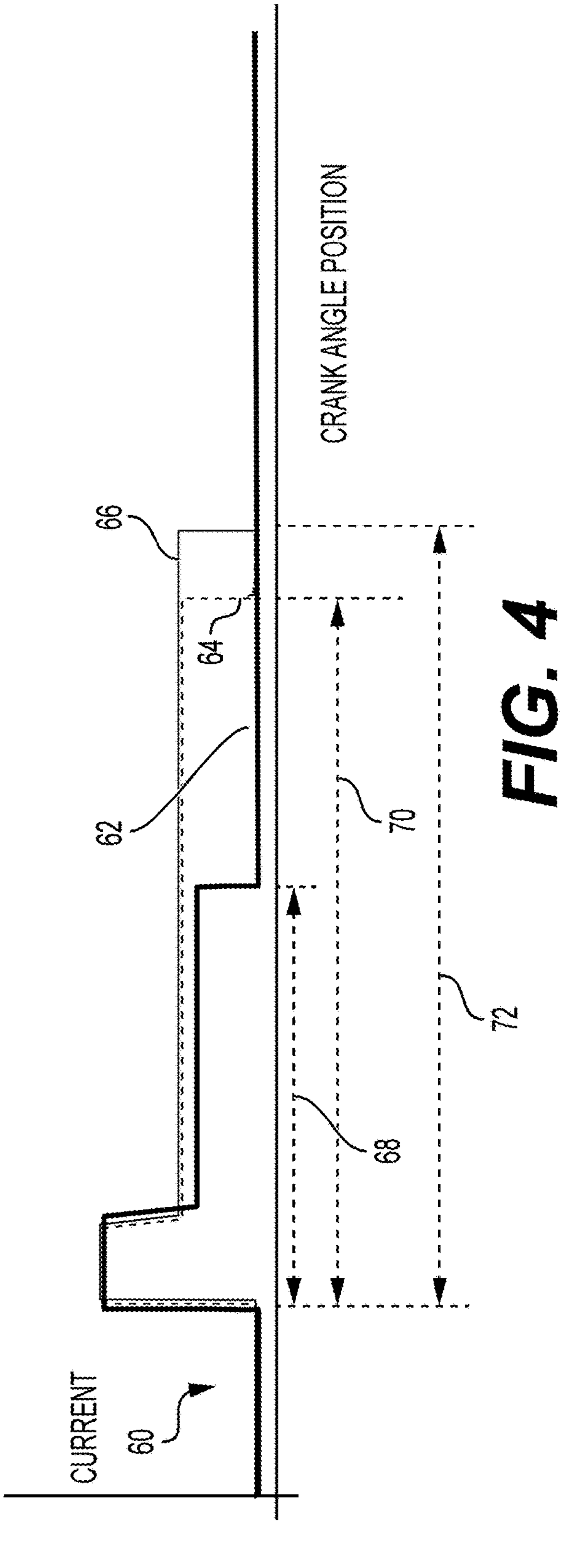
FIG. 4 is a chart illustrating waveforms for injecting different fuels in the system of FIG. 1.
Figure 5:
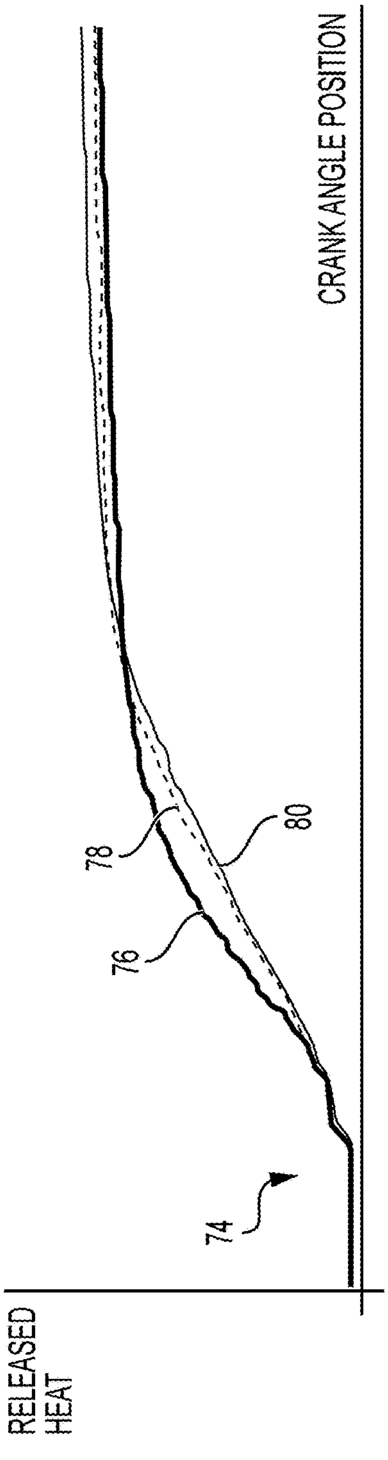
FIG. 5 is a chart illustrating heat release rates of fuel injected in the system of FIG. 1.

FIG. 3 is a flowchart illustrating exemplary steps of a method 300 for controlling an internal combustion engine for use with different fuel types. FIG. 4 is a chart illustrating three injection events in which current waveforms 60 are supplied to actuate an injector 16. In FIG. 4, differences between the amplitudes of the three waveforms are exaggerated for visualization. FIG. 5 is a chart illustrating cumulative detected released heat (e.g., a value calculated by integrating HRR over time) within the cylinder 14 in which one or more injectors 16 injected fuel.

With reference to FIG. 3, a step 302 of method 300 may include generating commands to inject fuel. Method 300 may be performed at startup of internal combustion engine 12, continuously during operation of internal combustion engine 12, at different intervals, or in response to determining that a fuel type may have changed. For example, method 300 may be performed in response to receiving a signal from fill sensor 26 that indicates that a level of fuel has increased, causing ECM 24 to determine that fuel was introduced into fuel storage device 36.

When the fuel type is known, step 302 may include generating commands that are based on this fuel type. These commands may be determined with command generator 55 based on primary fuel characteristics from fuel type maps 52 and the minimum amount of pilot fuel from pilot fuel minimizer 54 (FIG. 2).

When the fuel type is unknown (e.g., when signals from sensor 26 indicate that new fuel has been introduced to fuel storage device 36), the commands generated in step 302 may be set to determine or confirm the fuel type. This may, for example, cause ECM 24 to generate commands 56 that inject primary fuel for a relatively short duration, as described below with respect to FIG. 4 (e.g., duration 68).

A step 304 may include receiving, with ECM 24, signals that indicate combustion pressure. These signals may include cylinder pressure signal 38, for example. Step 304 may include determining combustion timing based on the received signals. Step 304 may also include receiving other signals, such as engine speed signal 40.

A step 306 may include determining the type of fuel that is present in system 10 (e.g., within fuel storage device 36) based on signals that indicate combustion pressure and the timing of combustion of the fuel. In step 306, ECM 24 may determine the type of fuel based on cylinder pressure signal 38, engine speed signal 40, and current duration 42. In particular, fuel type detector 48 may determine combustion data (e.g., IMEP, IAHRR, etc.) based on signals 38 and 40, and compare this combustion data to combustion data stored within fuel detection maps 50 and associated with different types of fuel.

Step 308 may include generating, with ECM 24, fuel injector commands that are based on the type of fuel that was determined in step 306. In a first aspect, these commands may include primary fuel commands 56 (FIG. 2) that determine the duration during which current is supplied for injecting primary fuel, examples of which are described below with respect to FIG. 4. Primary fuel commands 56 may be determined, or adjusted, with ECM 24 based on the detected fuel type. Commands 56 generated in step 308 may also be based on primary fuel characteristics from maps 52 to avoid exceeding, for example, EOI limits, maximum fuel quantity limits, air-fuel ratio limits, and other values that correspond to the fuel type identified with maps 50. Step 308 may also include generating pilot fuel commands 58 that determine a quantity of pilot fuel that will be injected to initiate combustion of the primary fuel. In some aspects, step 308 may include adjusting primary fuel commands 56 based on a minimum quantity of pilot fuel that will be injected via pilot fuel command 58.

In another aspect, commands 56 and 58 generated with ECM 24 in step 308 may be adjusted to maximize the amount of primary fuel that is injected and minimizes the amount of pilot fuel that is injected. Commands 56 and 58 may be adjusted, for example, based on a timing at which a predetermined quantity of heat has been released by combustion of the fuel. For example, fuel type detector 48 may determine a timing, or crank angle position, at which 5%, 10%, 25%, or 50% of the energy was released. Primary and pilot fuel commands 56 and 58 may be adjusted (e.g., by increasing the quantity of pilot fuel and decreasing the amount of primary fuel) if this timing exceeds (is later than) a predetermined threshold value which may indicate delayed combustion.

FIG. 4 includes waveforms 60 that represent current supplied to injectors 16 as the result of injector timing commands 56 (FIG. 2) which cause injectors 16 to inject fuel (e.g., primary fuel) to internal combustion engine 12. A first waveform 62 is determined according to injector commands 56 that are issued by fuel type characteristic maps 52 when the primary fuel is unknown. Waveform 62 may therefore be used to evaluate the fuel type. At other times, waveform 62 may be generated when the primary fuel is a first type of fuel (e.g., diesel fuel) that is the most energy-dense fuel that would be introduced to system 10. A second waveform 64 is determined according to commands 56 when the primary fuel is a second type of fuel (e.g., an ethanol-containing fuel such as E85). A third waveform 66 is determined according to commands 56 when the primary fuel is a third type of fuel (e.g., methanol).

As shown in FIG. 4, each waveform 62, 64, and 66 begins at the same point in time, which represents the commanded SOC. While all three SOCs are the same in FIG. 4 for illustration purposes, as understood, ECM 24 may alter the commanded SOC based on the fuel type. Following the SOC, the waveform reaches an initial, relatively high, level that initiates actuation of a valve of injector 16. The amplitude of current is lowered to a lower level, this lowering also occurring at the same time for each waveform 62, 64, and 66.

As shown in FIG. 4, the total amount of time, or duration, during which current is applied for each waveform 60 changes, as does the end of injection timing. In particular, the duration of current changes for each waveform 62, 64, and 66 based on the type of fuel identified with ECM 24. Waveform 62 is applied for a first duration 68. Duration 68 may correspond to the shortest duration stored in fuel type characteristic maps 52 (e.g., a duration associated with a fuel that has the highest energy density of the fuel types supplied to system 10, such as diesel fuel). This duration may ensure that the amount of power produced by the injection when fuel type is not known is suitable (e.g., not excessive).

Second waveform 64 is applied for a second duration 70. Third waveform 66 is applied for a third duration 72. Second duration 70 may be greater than first duration 68, and third duration 72 may be greater than second duration 70. As understood, a greater duration of current results in an injection of a larger quantity (e.g., greater mass and volume) of fuel. Thus, duration 70 results in the injection of more fuel than duration 68, and in the injection of less fuel than duration 72. Durations 70 and 72 may be retrieved from fuel type characteristic maps 52 according to the fuel type determined with fuel type detector 48. As an example, second duration 70 may result in injection of a suitable amount of ethanol fuel for generating a desired amount of power, while third duration 72 results in injection of a suitable amount of methanol fuel for the same amount of power. First duration 68 may also result in the generation of the same amount of power when the primary, or sole, fuel is diesel fuel.

FIG. 5 illustrates released heat plots 74, including a first heat plot 76, a second heat plot 78, and a third heat plot 80. First heat plot 76 may correspond to the heat released by fuel injected according to waveform 62, second heat plot 78 may correspond to waveform 64, and third heat plot 80 may correspond to waveform 66. The data represented by plots 74 may be generated based on cylinder pressure signal 38. This cumulative heat release data may allow fuel type detector 48 to determine the timing at which a predetermined amount of energy (e.g., 5%, 10%, 25%, or 50% of total energy) was released.

As can be seen in FIG. 5, while durations 68, 70, and 72 are significantly different from each other, the amount of released heat for injection of diesel fuel, ethanol, and methanol, respectively, are substantially similar. Accordingly, adjustments to injector commands 56 may result in generation of a desired amount of power for fuel types that are injected in significantly different qualities.

The disclosed system and method may allow an internal combustion engine to operate effectively on multiple types of fuel. The system and method may limit or eliminate the need to modify the engine or change any hardware connected to the engine. The system may enable use of two different fuels at the same time, including a pilot fuel and a primary fuel. In such configurations, the relative amounts of the pilot and primary fuels may be adjusted to maximize the amount of primary fuel that is used as a substitute for the pilot fuel. The control of injection duration, and in particular, end of injection limits, reduces or eliminates piston erosion, liner polishing, and high exhaust temperature. Further, adjusting engine settings such as injector commands according to a change in fuel type reduces unwanted emissions and achieves other environmental, cost, and efficiency benefits.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A system for controlling an internal combustion engine, the system comprising:
- an internal combustion engine configured to combust a plurality of fuels including a first fuel having a first energy density and a second fuel having a second energy density;
- a fuel injector configured to inject the first fuel and to inject the second fuel;
- a sensor configured to generate signals that indicate combustion of fuel within the internal combustion engine; and
- an electronic control module configured to:
  - receive the signals from the sensor,
  - generate commands to cause the fuel injector to inject fuel,
  - determine whether the injected fuel corresponds to the first fuel or to the second fuel based on the signals from the sensor, and
  - generate adjusted commands to cause the fuel injector to inject fuel based on whether the fuel was determined to correspond to the first fuel or to the second fuel.

2. The system of claim 1, wherein the sensor is an in-cylinder pressure sensor.

3. The system of claim 1, wherein the electronic control module is further configured to determine whether the injected fuel corresponds to the first fuel or to the second fuel based on an amount of time that current was supplied to the fuel injector.

4. The system of claim 1, wherein the electronic control module is further configured to adjust an end of injection timing based on whether the fuel corresponds to the first fuel or to the second fuel.

5. The system of claim 1, wherein the electronic control module is further configured to set a duration for supplying current to the fuel injector based on whether the fuel corresponds to the first fuel or to the second fuel.

6. The system of claim 1, wherein internal combustion engine is configured to combust a pilot fuel and a primary fuel, the pilot fuel and the primary fuel being liquid fuels, the first fuel and the second fuel being different primary fuels.

7. The system of claim 6, wherein the electronic control module is further configured to adjust an amount of pilot fuel that is injected and an amount of the primary fuel that is injected based on whether the fuel corresponds to the first fuel or to the second fuel.

8. A method for controlling an internal combustion engine that is capable of use with a primary fuel and a pilot fuel, the method comprising:
- generating commands that cause a fuel injector to inject the primary fuel for combustion in the internal combustion engine;
- receiving signals from a sensor, the signals indicating pressure according to combustion of the primary fuel within the internal combustion engine;
- determining whether the primary fuel corresponds to a first fuel or to a second fuel based on the signals from the sensor; and
- generating adjusted fuel injector commands based on whether the primary fuel was determined to correspond to the first fuel or to the second fuel.

9. The method of claim 8, wherein the adjusted fuel injector commands include fuel commands that increase an amount of time that current is supplied for actuating a fuel injector based on whether the primary fuel was determined to correspond to the first fuel or to the second fuel.

10. The method of claim 8, wherein the first fuel or the second fuel includes methanol, ethanol, or naphtha.

11. The method of claim 8, wherein the signals from the sensor indicate a mean effective pressure for the internal combustion engine.

12. The method of claim 8, further including detecting a fuel filling event and, in response to detecting the fuel filling event, determining whether the primary fuel corresponds to the first fuel or to the second fuel based on the signals from the sensor.

13. The method of claim 8, wherein the adjusted fuel injector commands are generated to prevent an end of injection timing from exceeding an end of injection timing limit, the end of injection timing limit being determined based on whether the primary fuel corresponds to the first fuel or to the second fuel.

14. A system for controlling an internal combustion engine, the system comprising:
- an internal combustion engine configured for use with different fuel types;
- a fuel injector configured to inject fuel;
- an in-cylinder pressure sensor connected to the internal combustion engine; and
- an electronic control module configured to:
  - receive signals from the in-cylinder pressure sensor,
  - generate commands to cause current to be supplied to the fuel injector for a duration, the current causing the fuel injector to inject the fuel, and
  - determine the duration based on the signals from the in-cylinder pressure sensor.

15. The system of claim 14, wherein the electronic control module is configured to determine the duration based on a timing of heat release from combustion of the fuel.

16. The system of claim 14, wherein the electronic control module is configured to adjust a limit for an ending time of a fuel injection event based on the signals from the in-cylinder pressure sensor.

17. The system of claim 14, wherein the fuel is a primary fuel, and the electronic control module is configured to adjust an amount of a pilot fuel and an amount of the primary fuel that is injected based on the signals from the in-cylinder pressure sensor.

18. The system of claim 14, wherein the internal combustion engine is configured to combust methanol, ethanol, and naphtha and the electronic control module adjusts the duration when the fuel is changed from one of methanol, ethanol, and naphtha to another one of methanol, ethanol, and naphtha.

19. The system of claim 14, wherein the fuel is a primary fuel and the system is further configured for injection of a pilot fuel for the internal combustion engine,
- the electronic control module being configured to adjust the duration for causing the fuel injector to inject the primary fuel based on an end of injection limit associated with the fuel type of the primary fuel.

20. The system of claim 19, wherein the electronic control module is configured to generate commands for injecting a reduced amount of the primary fuel and an increased amount of the pilot fuel to avoid injecting the primary fuel for a duration that would exceed the end of injection limit.

* * * * *